United States Patent [19]
Rasmussen

[11] Patent Number: 4,505,298
[45] Date of Patent: Mar. 19, 1985

[54] FLUID DISPENSING VALVE ASSEMBLY
[75] Inventor: Robert Rasmussen, Minneapolis, Minn.
[73] Assignee: Progressive Assembly Machine Co., Inc., Plymouth, Minn.
[21] Appl. No.: 532,599
[22] Filed: Sep. 15, 1983
[51] Int. Cl.³ .............................................. F16K 15/00
[52] U.S. Cl. .................................. 137/540; 141/117; 239/533.15; 222/496; 222/571
[58] Field of Search ............... 222/491, 495, 496, 571; 239/533.1, 533.15, 570; 137/516.29, 543.17, 540; 141/115–117

[56] References Cited
U.S. PATENT DOCUMENTS

| | | | |
|---|---|---|---|
| 2,619,116 | 11/1952 | Ralston | 137/561 |
| 2,697,446 | 12/1954 | Harrington | 137/509 |
| 2,905,361 | 9/1959 | Noall | 222/1 |
| 3,162,336 | 12/1964 | Erickson | 222/309 |
| 3,341,076 | 9/1967 | Wasilewski et al. | 222/76 |
| 3,356,104 | 12/1967 | Canalizo | 137/516.29 |
| 3,785,526 | 1/1974 | Shinn | 222/14 |
| 3,828,985 | 8/1974 | Schindler | 222/207 |
| 4,039,003 | 8/1977 | Cheek | 137/516.29 |
| 4,062,479 | 12/1977 | Szabo | 222/495 |
| 4,096,971 | 6/1978 | Kückens | 222/1 |

Primary Examiner—Samuel Scott
Assistant Examiner—Allen J. Flanigan
Attorney, Agent, or Firm—Dorsey & Whitney

[57] ABSTRACT

A dispensing valve assembly for accurate volumetric dispensation of delicate fluids is disclosed, suitable for use with a fluid dispensing system. The valve has a poppet that is movable within a chamber. A bias spring or external operator urges the poppet towards the top of the chamber, so that a circumferential elastomeric seal engages with the chamber wall. Pressure of fluid to be dispensed entering the top of the chamber forces the poppet towards the bottom of the chamber, disengaging the seal from the chamber wall and allowing fluid to pass around the seal and then out of the chamber through an outlet opening at the bottom of the chamber. Downward travel of the poppet is stopped when the bottom of the poppet contacts the bottom of the chamber. Release of fluid pressure allows the poppet to be forced towards the top of the chamber once again, engaging the seal with a chamber wall. Continued upward displacement deforms the elastomeric material of the seal and results in a pumping action which pumps a portion of the fluid out of the outlet opening, so preventing dripping from the outlet. Chamber structure and seal hardness are chosen to limit pumping action to avoid air backup into the chamber, so preventing foaming of the fluid.

15 Claims, 3 Drawing Figures

FLUID DISPENSING VALVE ASSEMBLY

BACKGROUND OF THE INVENTION

1. Field of the Invention

This invention relates generally to dispensing measured amounts of fluids. More particularly, this invention relates to a valve assembly for dispensing accurately measured volumes of sensitive fluids with a minimum of damage to the fluid.

2. Description of the Prior Art

Research and commercial establishments require the facility of being able to dispense accurately measured amounts of fluids on a repetitive basis. The prior art discloses fluid dispensing systems that transfer a fluid from a source point to a dispensing point. Some of these systems calibrate the volume of fluid transferred. Once the calibrated volume of fluid has been transferred to a dispensing point, the fluid must be dispensed from the system, typically into a waiting container. Frequently, as on a production line, a measured volume of fluid must be dispensed repeatedly into a series of containers.

When the fluid to be dispensed is delicate, such as blood solutions, it is important that the means used to dispense the fluid does not damage the fluid. It is also important that the dispensing means does not influence the fluid volume preselected for dispensing. If a dispensing means alters that preselected volume, the accuracy of the calibrated amount is lost, and different containers may not contain the same volume of fluid. Where dispensing the fluid volume is repeated, it is important that the fluid is dispensed cleanly, with no dripping of fluid which could contaminate the necks and exterior surfaces of containers, or the support and transfer system of the containers. Finally, it is important that any dispensing means can be rapidly and easily cleaned for reuse with a different fluid.

To applicant's knowledge there is no dispensing valve assembly disclosed in the prior art that can meet these requirements.

Applicant's invention fills the need for a dispensing valve assembly that can dispense measured volumes of fluid repetitively with a high degree of accuracy. The action of the valve assembly of the invention preserves a preselected volume received from a calibrated pump. The design of applicant's invention enables it both to be directly associated with such a pump and to dispense directly into fluid containers, so eliminating the need for long fluid supply lines, which can increase the probability of volumetric error.

The present invention also fills the need for a dispensing means that is protective of delicate fluid, as the invention presents only a minimum crushing area to the fluid.

The present invention also fills the need for a non-dripping dispensing means, as the pumping action of the invention at the end of the dispensing cycle, sucks back fluid from the outlet point. This antidrip feature of the present invention is achieved while avoiding a backup of air into the invention, thus avoiding foaming of the fluid, which would introduce both errors in volume dispensing and the possibility of damage to the fluid.

The present invention fills these needs and also provides a dispensing valve assembly that can be quickly and easily disassembled for cleaning.

SUMMARY OF THE INVENTION

The present invention involves a fluid dispensing valve assembly, suitable for use with a fluid dispensing system. The invention enables the accurate single or repeated dispensing of a preselected volume of a delicate fluid.

The invention provides a valve poppet within a valve chamber. The poppet interacts with the bottom of the chamber via a spring. A seal of elastomeric material sits in a circumferential groove in the outer wall of the poppet. When the spring expands, the poppet is forced upward within the chamber and the seal engages with a tapered portion of the chamber wall. The elastomeric material of the seal deforms on engagement. The upward travel of the poppet is limited by the configuration of the top of the chamber or by interaction with a dispensing system. An inlet near the top of the chamber allows entry of fluid under pressure from a dispensing system. The pressure of the entering fluid overcomes the force of the spring and displaces the valve poppet downwards within the chamber, to break the engagement of the seal with the chamber wall and allow fluid to flow past the seal and, subsequently, out of an outlet at the bottom of the chamber. Downward travel of the poppet ends when the bottom of the poppet makes contact with the bottom of the chamber. Release of entering fluid pressure allows the poppet to be forced upwards once again by the spring, to engage the seal and cut off fluid flow through the valve.

As will be seen, the invention provides an effective means to accurately dispense measured volumes of delicate fluid products. The invention allows dispensing with a minimum of damage to the product from crushing or foaming. A no-drip feature, a no-foaming feature and a positive downward travel limitation feature of the invention each, and in combination, enable accurate control of the fluid volume dispensed, as the dispensing action of the invention preserves the volume premeasured for dispensing. Direct dispensing into fluid containers and direct attachment of the invention to a dispensing system eliminate the need for long fluid feed lines that can introduce volumetric error. The structure of the invention allows easy removal and replacement of the invention on a dispensing system and also allows easy disassembly of the invention for cleaning and maintenance.

Accordingly, an objective of the invention is to provide an easily cleaned and maintained means for dispensing sensitive fluid products with minimum damage to the fluid while ensuring that the volume dispensed is true to a preselected value.

A further objective is to provide a valve assembly having a pumping action that sucks back fluid into its outlet to prevent dripping.

A further objective is to provide a valve assembly which upon closing avoids air backup into the valve chamber, which could cause foaming of the dispensed fluid.

A further objective is to provide a valve assembly having a valve poppet and seal configuration such that a minimum of shearing force is applied to the dispensed fluid.

These and other objectives of the invention will become apparent from a study of the following description of the preferred embodiment and the following figures.

DESCRIPTION OF THE PREFERRED EMBODIMENT

Figure 1:
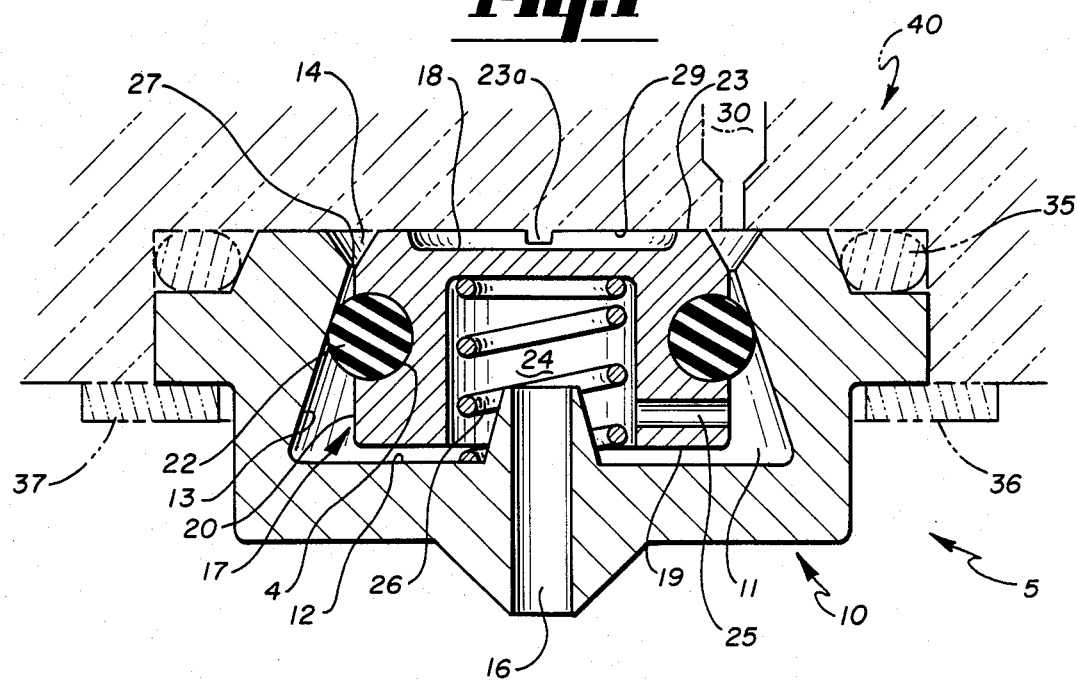
FIG. 1 is a vertical cross section of a valve assembly constructed in accordance with the present invention.

In FIG. 1 the valve assembly 5 has a valve body 10 containing a roughly cylindrical chamber 11 which has a bottom wall 12, a side wall 13, and an inlet opening 14, which comprises the entire open area above a valve poppet 17 at the top of the chamber 11 in the preferred embodiment shown. Extending through the bottom wall 12 is an outlet opening 16, which comprises a cylindrical passage, elongated both above and below the bottom wall 12.

Within the chamber 11 is the roughly cylindrical valve poppet 17, which has an upper surface 18, a lower surface 19, and an outer wall 20. The outer wall 20 has a circumferential groove 4. A seal 22 of elastomeric material is seated in the circumferential groove 4. The center of the upper surface 18 of the valve poppet 17 is countersunk to form a projecting annular stop 23.

In the embodiment illustrated in FIG. 1, the valve poppet 17 has a cylindrical cavity 24 open toward its lower surface 19. A channel 25 connects the cavity 24 to the volume outside the outer wall 20 of the poppet 17. A bias spring 26 sits compressed within the cavity 24. It presses against the bottom 12 of the chamber 11 to urge the poppet 17 upward. The upward elongation of the outlet opening 16 helps hold the spring 26 in place.

It should be noted that the volume of the chamber 11 of the valve assembly 5 is relatively small, with the diameter of the poppet 17 and the chamber 11 being appropriate for the desired flow rate. It should further be noted that a significant portion of the volume of the chamber 11 is occupied by the poppet 17 and its seal 22. Thus, a relatively small volume remains to be occupied by the fluid to be dispensed.

The side wall 13 of the chamber 11 tapers outward both above and below a neck 27 which represents the narrowest point in the chamber 11. The tapered surface below this narrowest point forms a valve seat for the seal 22 carried by poppet 17. The external dimension of the poppet 17 with the elastomeric seal 22 is such that it is slightly greater than the cross sectional dimension of the chamber 11 at the neck 27 to fit snugly against the valve seat. The external dimension of the poppet 17 alone is slightly less than the cross sectional dimension of the chamber at the neck 27.

In FIG. 1 the spring 26 is shown expanded such that the valve poppet 17 is forced towards the top of the chamber 11. In this position, the elastomeric seal 22 engages the chamber wall 13 just below the neck 27. The upward travel of the poppet 17 is limited when the stop 23 contacts the lower surface 29 of the fluid dispensing system 40 (shown in phantom lines); however, engagement of the seal 22 with the valve seat formed by the side wall 13 occurs just prior to contact between the stop 23 and the lower surface of the dispensing system 29. The annular stop 23 prevents a large surface-to-surface contact which could lead to liquid lock between the poppet's upper surface 18 and the lower surface 29 of the dispensing system 40. (If desired, the annular stop can be separated into segments by rapid grooves 23a.) The relative dimensions of the poppet 17 and the chamber 11 are such that the spring 26 is not fully extended when the upward travel of the poppet 17 is complete.

In the embodiment shown, the fluid to be dispensed is delivered under pressure by a dispensing system. It enters the chamber inlet 14 via a flow limiting orifice 30 (shown in phantom lines) which may be a part of the dispensing system 40. The spring 26 is selected so that the downward pressure of entering fluid on the upper surface 18 of the poppet 17 overcomes the upward bias force of the spring 26 and any friction at the seal 22. This forces the valve poppet 17 towards the bottom wall 12 of the chamber 11. The seal 22 will then break sealing engagement with the side wall 13, permitting fluid to pass around the seal 22 and out of the chamber 11 through the outlet 16. With the circular cross-section of seal 22 seating against a flat portion of the side wall 13, the valve assembly 5 presents a very small area at which the fluid can be crushed. The invention is thus of a special importance for the dispensing of delicate fluids, such as blood solutions, which may be easily damaged.

With sufficient pressure from the entering fluid, the downward travel of the poppet 17 becomes limited by contact between the lower surface 19 of the poppet 17 and the bottom wall 12 of the chamber 11. Fluid that continues to enter the inlet opening 14 must then pass through the channel 25 into the hollow cavity 24 of the poppet 17 to exit through the outlet opening 16. The spring 26 is selected such that it is not fully compressed when the valve poppet 17 comes into contact with the bottom wall 12.

As can be seen, due to the relative heights of the poppet 17 and the chamber 11 as well as the location and size of the seal 22 relative to the neck 27, the travel of the poppet 17 from the point at which the valve is closed to the point at which it is fully open is limited. In the preferred embodiment, the travel is approximately one-tenth the height of the chamber 11 or less. Travel is always substantially less than the height of the chamber 11. This has several useful consequences. When the pressure of the fluid to be dispensed is released, the distance of travel of the poppet 17 until the seal 22 seals against the side wall 13, and hence the time lapse before fluid flow is cut off is small. Thus, the amount of fluid dispensed before the poppet 17 seats is small. It is also relatively predictable. By positively limiting the upward and downward travel of the poppet 17, its movement during each dispensing operation is determined. Variations in the dispensed fluid volume due to variations in the closing action of the valve assembly 5 are limited. If there were no positive limitation of downward travel, the position of the poppet 17 within the chamber 11 during dispensing would depend on a balance between fluid pressure and spring pressure and could vary.

The valve poppet 17 is held against the bottom wall 12 by the pressure of entering fluid. When a preselected volume of fluid has been dispensed by the dispensing system 40, fluid flow and pressure from the dispensing system 40 stop. The release of fluid pressure within the valve chamber 11 allows the spring 26 to force the poppet 17 upward until the seal 22 again engages the chamber wall 13 below the neck 27 and, subsequently, the stop 23 on the upper surface 18 of the poppet 17 makes contact with the lower surface 29 of the dispensing system.

As the material of the seal 22 is elastomeric, the continued upward pressure of the spring 26, after the seal 22 has engaged the chamber wall 13, causes slight deformation of the seal 22. The deformation permits the poppet 17 to continue to travel upward for a short distance after the initial contact of the seal 22 with the side wall 13. This results in a pumping action within the chamber 11 below the seal 22. A portion of the volume of fluid present in the outlet opening 16 is pumped upward, so preventing drop formation and dripping at the outlet opening 16. This antidrip feature of the invention also aids accurate dispensing of a preselected volume of fluid. It also provides for clean dispensing. For example, it is anticipated that the invention will be used in fluid dispensing systems that dispense into a series of containers passing in sequence under the outlet opening 16. The antidrip feature prevents contamination of the necks and exterior surfaces of the containers or of the container support and transport systems (not shown), so enabling a clean dispensing operation and preventing dried material from collecting on the nozzle edge.

In the preferred embodiment, the elastomeric material of the seal 22 is chosen to be of such hardness and the chamber wall 13 is tapered such that the pumping action occurring during valve seating displaces a fluid volume which is less than the volumetric capacity of the outlet opening 16. Dripping from the outlet opening 16 is prevented, but some fluid remains in the outlet opening 16 and prevents air backup into the valve chamber 11. By preventing air backup into the chamber 11, foaming of the fluid is prevented. If such foaming occurred, it might cause damage to a delicate fluid and could also affect the accuracy of the next volume of fluid dispensed. This antifoam feature of the invention thus contributes to the accurate measurement and dispensing of the preselected fluid volume and helps protect the fluid dispensed. While the first volume dispensed through a previously unused valve assembly 5 will be slightly reduced by the volume necessary to fill the chamber 11 and a portion of the outlet opening 16, on the second and subsequent volumes dispensed the action of the poppet 17 becomes uniform and a preselected volume can be dispensed accurately and repeatedly.

Applicant has found that a shallow taper of the chamber wall 13 towards the neck 27, approximately ten to thirty degrees of slope, and an elastomeric material for the seal 22 of from about forty durometers to about 70 durometers hardness is a suitable combination to prevent dripping and avoid foaming of the fluid in most commercial applications. This combination is also otherwise convenient in the construction of the invention as a spring 26 of only moderate tension is needed to cause a sufficient deformation of the seal 22.

The valve body 10 and the poppet 17 may be made of any suitable materials. Among those which would be preferred are solid Teflon, aluminum coated with Teflon, or stainless steel.

In the preferred embodiment shown in FIG. 1, the shape and relative dimensions chosen for the valve chamber 11 and the valve poppet 17, plus the use of the entire chamber top as an inlet 14 for fluid into the chamber 11, allow applicant to assemble the valve assembly 5 by snapping the poppet 17 with its circumferential seal 22, and the spring 26, into the valve chamber 11. Disassembly can be achieved by applying a moderate amount of pressure upwards on the valve poppet 17 by means of an elongated instrument inserted into the single dispensing nozzle 16. This physical embodiment allows for rapid and easy disassembly for cleaning.

The valve body 10 may advantageously be retained within a receptacle of dispensing systems 40 by retaining clips 36, 37. An O-ring seal 35 provides a fluid tight seal between the valve body 10 and the dispensing system 40. It is to be understood that valve body 10 may alternatively be threadably received within the receptacle, or may be retained by any other suitable device.

Figure 2:
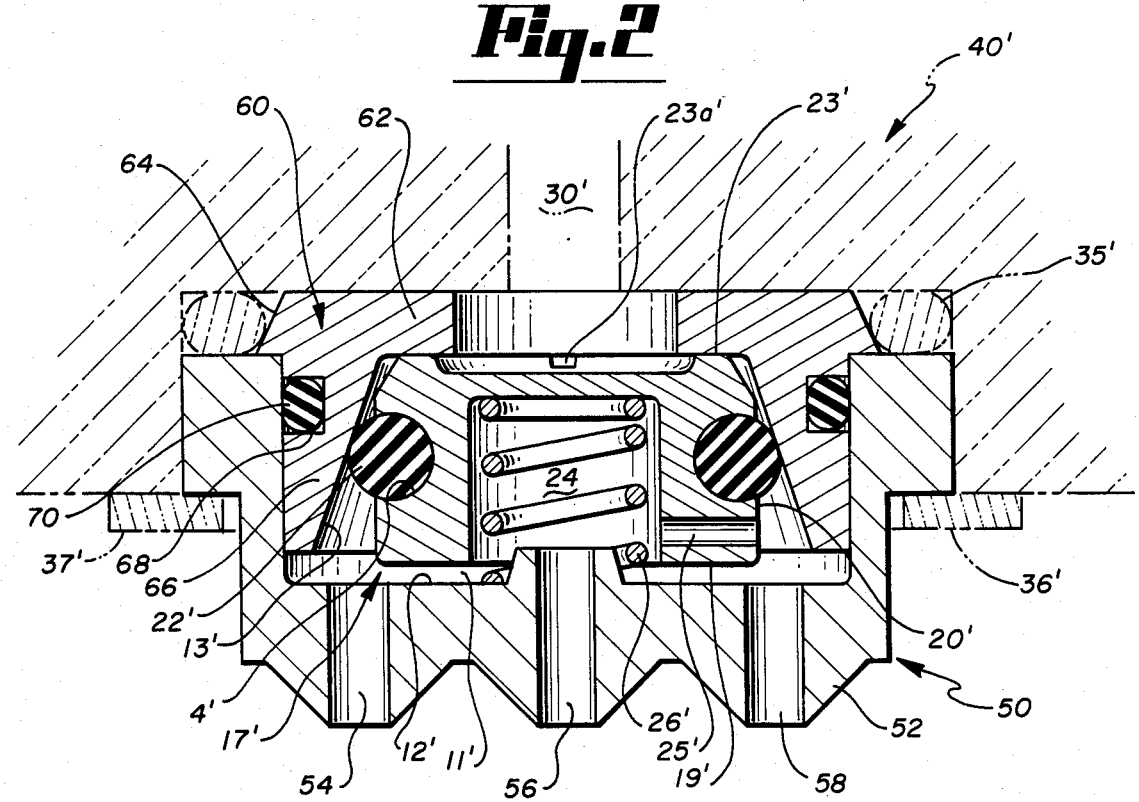
FIG. 2 is a vertical cross section of a second embodiment of a valve assembly constructed in accordance with the present invention.

Referring to FIG. 2, an alternative embodiment of a fluid dispensing valve assembly 50 is depicted. The valve body 50 includes spout portion 52 that incorporates a plurality of dispensing channels 54, 56, 58.

A cover portion 60 is received within spout portion 52. The cover portion 60 includes apertured top wall 62 having a radially extending retaining flange 64, and a depending, generally annular side wall 66. The side wall 66 includes external grooves 68 wherein O-ring 70 is retained. It will be appreciated that the sloped, inner side wall 13' of cover portion 60 performs the same function as the sloped side wall 13 described in conjunction with the first embodiment, and the slope of side wall 13' incorporates the same slope limits of from about 10 degrees to about 30 degrees. Moreover, it will be appreciated that the top wall 62 defines the upper limit of chamber 11'.

The poppet mechanism, and retaining mechanism of the second embodiment are similar in construction to that described in accordance with the first embodiment. Accordingly, like features are noted with primed, similar numbers.

It will be appreciated that the removability of the cover portion 60 of the second embodiment depicted in FIG. 2 provides for easy access to the poppet 17'. The operation of the valve body 50 in accordance with the second embodiment, however, is essentially identical to that described above in conjunction with the first embodiment.

Figure 3:
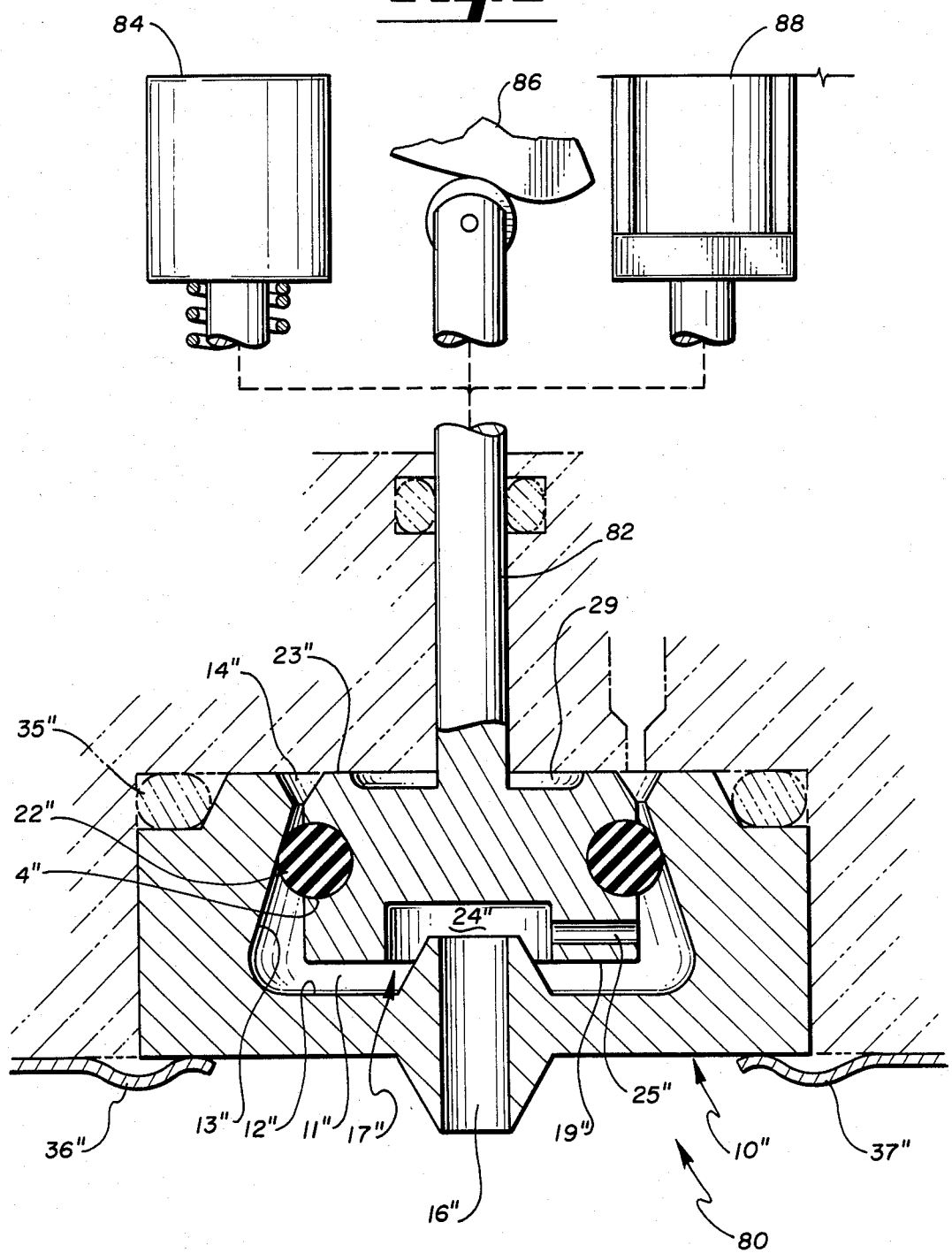
FIG. 3 is a fragmentary, sectional view of a third embodiment of a valve assembly constructed in accordance with the present invention.

Referring to FIG. 3, a third embodiment of a dispensing valve assembly 80 in accordance with the present invention is depicted. The third embodiment 80 incorporates a positively acutated poppet mechanism in contrast to the spring biased poppet disclosed in the first and second embodiments.

Similar to the first embodiment described above, the valve assembly 80 includes valve body 10'' containing a roughly cylindrical chamber 11'' which has a bottom wall 12'', side wall 13'', and inlet opening 14''. Extending through the bottom wall 12'' is an outlet opening 16'', which comprises a cylindrical passage, elongated both above and below the bottom wall 12''.

The valve 80 includes a poppet 17'' having an annular stop 23'', channel 25'' and elastomeric seal 22''. The slope of side wall 13'', and the durometer of seal 22'' advantageously incorporate the same parameters as described in conjunction with the first and second embodiments above. Moreover, the valve body 10'' may be retained in a fluid dispensing system 40'' by clips 36'', 37'' in a manner likewise described above.

The third embodiment of the valve assembly 80, however, differs from the first and second embodiments in that it does not include a biasing spring within the chamber 24'' of the poppet 17'''. Rather, an actuating rod 82 is fixedly connected to the top wall of poppet 17'''. The actuating rod 82 may be coupled to either a solenoid 84, a mechanical cam 86, or a piston and cylinder arrangement 88 for selective upward and downward shifting movement. The actuating movement of rod 82 would, in practice, be synchronized with the pumping action of the pump system 40 so as to depress the poppet 17″ during the dispensing stroke, and to raise poppet 17″ during the pump intake cycle.

It is evident that the present invention can take a variety of forms of physical embodiment without departing from the spirit and scope of the invention. The overall shape of the chamber 11 can vary, as long as the circumferential seal 22 engages with the chamber wall 13 at some point. The shape of the poppet 17 can also vary as long as its dimensions are such that it can travel a short distance vertically within the chamber 11 while the seal 4 is in contact with wall 13. An inlet can be placed anywhere in the region of the chamber top. Likewise, an outlet can be positioned anywhere within the vicinity of the bottom of the chamber, and can be other than the nozzle form of outlet that is illustrated. The poppet bias means can be other than a spring, or, if a spring, can be positioned differently than in the embodiments shown.

It will be clear to one skilled in the art that a number of modifications can be made to the above described embodiments without essentially changing the invention. Accordingly, while the preferred and alternative embodiments of the invention have been described and illustrated, it is to be understood that the invention is not limited to the precise constructions herein disclosed, and the right is reserved to all changes and modifications coming within the scope of the invention as defined in the appended claims.

I claim:

1. A fluid dispensing valve assembly for dispensing a fluid fed to the valve under pressure comprising:
    a valve body incorporating a valve chamber having a bottom wall, and a side wall connected to the bottom wall, a portion of the side wall being tapered inwardly as it rises above the bottom wall, such that a portion of the chamber has cross sectional dimensions of progressively decreasing size from the bottom wall towards the top of the chamber to form a valve seat, the valve body also having at least one inlet opening leading to the top of the chamber through which the fluid to be dispensed can enter the chamber, and at least one outlet opening at the bottom of the chamber through which the fluid to be dispensed can exit from the chamber;
    a valve poppet located within the chamber adjacent the valve seat and the bottom wall, the poppet having an upper surface and a lower surface and an outer wall intermediate the upper and lower surfaces;
    bias means urging the valve poppet towards the top of the chamber and against the valve seat with a force that can be overcome by the pressure of the fluid to be dispensed against the upper surface of the poppet; and
    an elastomeric circumferential seal affixed to the outer wall of the valve poppet, the seal having an external dimension sufficiently large for it to sealingly engage the valve seat when the poppet is displaced towards the top of the chamber, the dimension of the seal and the height of the poppet relative to the height of the chamber being selected so that the distance the poppet travels between a valve closed position, whereby the seal engages the valve seat, and a valve fully open position, whereby the force of the bias spring is overcome and the lower surface of the poppet is driven against the bottom wall of the chamber, is substantially less than the height of the chamber.

2. The valve assembly as recited in claim 1 wherein the valve chamber and valve poppet both have a substantially circular cross section.

3. The valve assembly as recited in claim 2 wherein the valve poppet has a cavity in its lower surface which communicates with the inner end of an outlet opening and further has a dispensing channel which communicates between the cavity and the outer wall of the poppet at a point between the seal and the bottom surface, whereby when the valve is in its fully open position fluid can flow past the seal, through the channel, into the cavity and out through the outlet opening.

4. The valve assembly as recited in claim 1 wherein the valve body has a top wall through which the at least one inlet opening communicates and wherein the top wall serves to limit upward travel of the poppet against the valve seat without inhibiting the sealing engagement of the seal against the valve seat.

5. The valve assembly as recited in claim 5 wherein the upper surface of the poppet has one or more projections thereon to prevent liquid lock of the upper surface of the poppet against the top wall of the valve body.

6. The valve assembly as recited in claim 1 wherein the valve chamber is open above the poppet and upward travel of the poppet is limited by a connection surface of a dispensing system to which the valve assembly is connected without inhibiting the sealing engagement of the seal against the valve seat.

7. The valve assembly of claim 1 wherein the bias means is a spring.

8. The valve assembly of claim 7 wherein the valve poppet has a cavity in its lower surface and the spring is located in the cavity.

9. The valve assembly of claim 7 wherein the at least one outlet opening comprises a passage through the bottom wall having a specified volume and wherein the seating action of the elastomeric seal against the valve seat pumps a portion of the dispensed fluid from the passage back into the chamber which does not exceed the specified volume.

10. The valve assembly of claim 9 wherein the at least one outlet opening is a passage through the bottom wall of the chamber which is extended above the bottom wall into the chamber.

11. The valve assembly of claim 10 wherein the at least one outlet opening is extended below the bottom wall.

12. The valve assembly of claim 1 wherein the valve poppet occupies a substantial portion of the volume of the valve chamber.

13. The valve assembly of claim 1 wherein the cross sectional dimension of the poppet without the elastomeric seal is slightly less than the cross sectional dimension of the chamber at the narrowest point of the valve seat and is slightly greater than the cross sectional dimension of the chamber at the narrowest point of the valve seat when the elastomeric seal is affixed to the poppet.

14. The valve assembly of claim 1 wherein the distance the poppet travels between a valve closed position and a valve open position is substantially less than one half the height of the chamber.

15. The valve assembly of claim 1 wherein the distance the poppet travels between a valve closed position and a valve open position is approximately one tenth of the height of the chamber.

* * * * *